US011861340B2

United States Patent
Kauffman et al.

(10) Patent No.: US 11,861,340 B2
(45) Date of Patent: Jan. 2, 2024

(54) UNIVERSAL RETURN TO FACTORY IMAGE PROCESS

(71) Applicant: NetApp, Inc., Sunnyvale, CA (US)

(72) Inventors: Keith Kauffman, Boulder, CO (US); Marshall McMullen, Boulder, CO (US); Eric Peters, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 144 days.

(21) Appl. No.: 17/243,974

(22) Filed: Apr. 29, 2021

(65) Prior Publication Data
US 2022/0350584 A1    Nov. 3, 2022

(51) Int. Cl.
*G06F 8/61* (2018.01)
*G06F 9/445* (2018.01)
*G06F 8/65* (2018.01)

(52) U.S. Cl.
CPC .......... *G06F 8/63* (2013.01); *G06F 8/65* (2013.01); *G06F 9/44505* (2013.01)

(58) Field of Classification Search
None
See application file for complete search history.

(56) References Cited

U.S. PATENT DOCUMENTS

| | | | | |
|---|---|---|---|---|
| 5,974,567 A | * | 10/1999 | Dickson, Jr. | G06F 11/2284 714/36 |
| 6,591,376 B1 | * | 7/2003 | VanRooven | G06F 11/1417 714/36 |
| 10,963,570 B2 | * | 3/2021 | Hinrichs | G06F 9/4416 |
| 11,256,519 B2 | * | 2/2022 | Zhan | G06F 8/63 |
| 2003/0084368 A1 | * | 5/2003 | Sprunt | G06F 11/1435 714/E11.136 |
| 2011/0302572 A1 | * | 12/2011 | Kuncoro | G06F 8/66 711/E12.008 |
| 2013/0318515 A1 | * | 11/2013 | Bowen | G06F 8/656 717/168 |
| 2017/0090896 A1 | * | 3/2017 | Lin | G06F 8/61 |
| 2017/0329593 A1 | * | 11/2017 | McMullen | G06F 11/1433 |
| 2021/0247921 A1 | * | 8/2021 | Anderes | G11C 29/4401 |

* cited by examiner

*Primary Examiner* — Marina Lee
(74) *Attorney, Agent, or Firm* — Jaffery Watson Mendonsa & Hamilton LLP

(57) ABSTRACT

Systems and methods for file system management are provided. According to one embodiment, a non-transitory computer-readable medium comprises instructions that when executed by the processing resource cause the processing resource to implement, in a storage node, a multi-tiered file system comprising a read-only layer that contains a base configuration for the storage node and a read-write layer that contains modifications to the base configuration; and combine the read-only layer and the read-write layer into an overlay file system to be presented to an operating system.

18 Claims, 16 Drawing Sheets

UNIVERSAL RETURN TO FACTORY IMAGE PROCESS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2020, NetApp, Inc.

BACKGROUND

Field

Various embodiments of the present disclosure generally relate to system management in a data storage system. In particular, some embodiments relate to systems and techniques to implement a universal return to factory image process on electronic devices.

Description of the Related Art

The phrase return to factory image (RTFI) refers to the installation of operating system software components onto the memory of electronic devices. For example, some storage devices implement an RTFI process to install one or more operating system components onto a blank storage node, or to update or replace one or more operating system components on an existing installed storage node. Managing RTFI processes can be beneficial in terms of improving operating performance of devices and systems.

SUMMARY

Systems and methods are described for providing a return to factory image are described and claimed. According to one embodiment, a method comprises implementing, in a storage node, a multi-tiered file system comprising a read-only layer that contains a base configuration for the storage node and a read-write layer that contains modifications to the base configuration and combining the read-only layer and the read-write layer into an overlay file system to be presented to an operating system.

In another embodiment, a system comprises a processing resource and a non-transitory computer-readable medium, coupled to the processing resource, having stored therein instructions that when executed by the processing resource cause the processing resource to implement, in a storage node, a multi-tiered file system comprising a read-only layer that contains a base configuration for the storage node and a read-write layer that contains modifications to the base configuration and combine the read-only layer and the read-write layer into an overlay file system to be presented to an operating system.

In another embodiment, a non-transitory computer-readable storage medium embodying a set of instructions, which when executed by a processing resource cause the processing resource to implement, in a storage node, a multi-tiered file system comprising a read-only layer that contains a base configuration for the storage node and a read-write layer that contains modifications to the base configuration and combine the read-only layer and the read-write layer into an overlay file system to be presented to an operating system.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
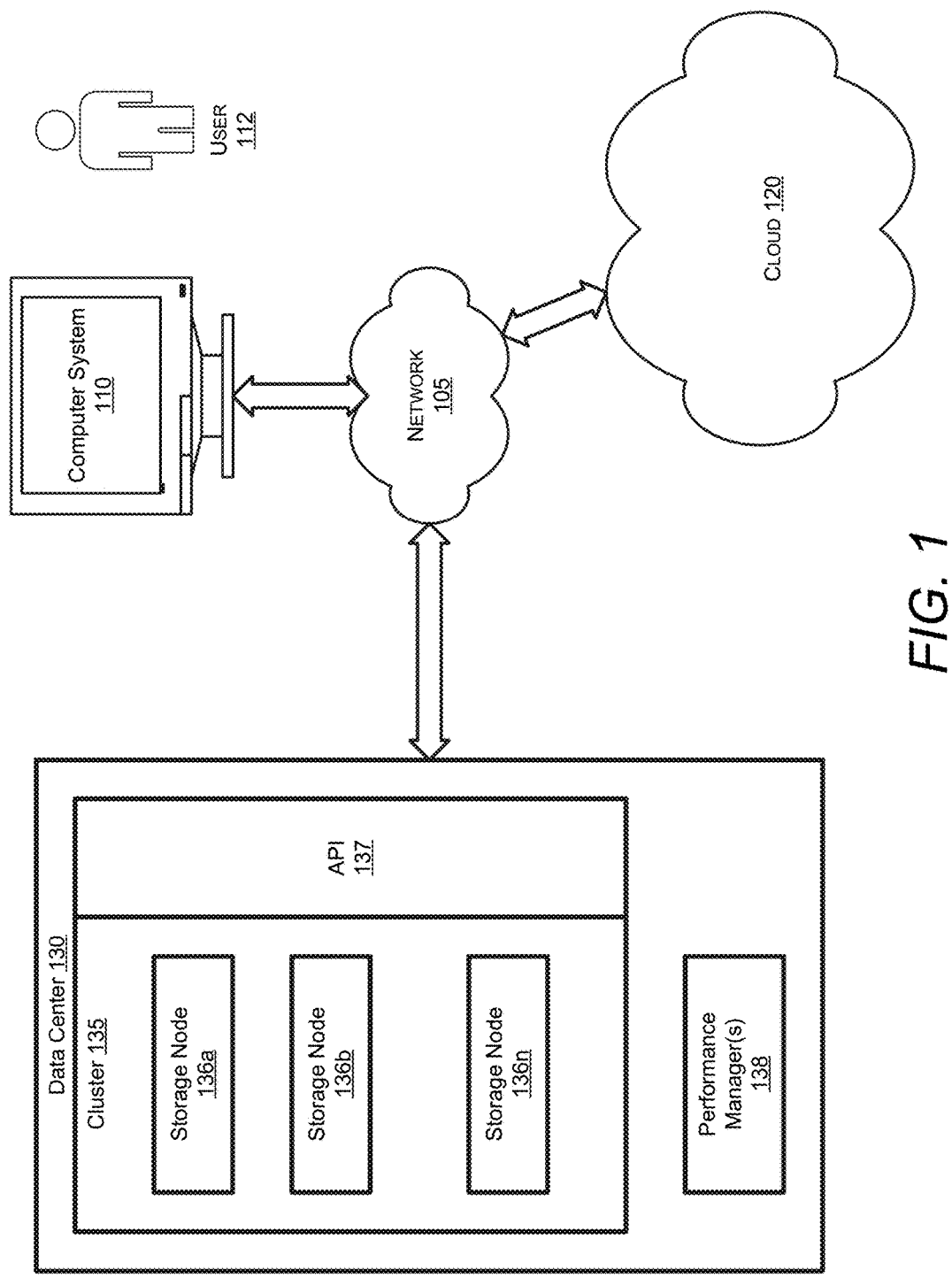
FIG. 1 is a block diagram illustrating a data processing environment in which various embodiments may be implemented.

Systems and methods are described for providing a universal return to factory image (RTFI) process in a distributed computing system. In some embodiments, a method performed by one or more processing resources of one or more computer systems comprises implementing, in a storage node, a multi-tiered file system comprising a read-only layer that contains a base configuration for the storage node and a read-write layer that contains modifications to the base configuration; and combining the read-only layer and the read-write layer into an overlay file system to be presented to an operating system.

In other embodiments, a system comprises a processing resource and a non-transitory computer-readable medium, coupled to the processing resource, having stored therein instructions that when executed by the processing resource cause the processing resource to implement, in a storage node, a multi-tiered file system comprising a read-only layer that contains a base configuration for the storage node and a read-write layer that contains modifications to the base configuration and combine the read-only layer and the read-write layer into an overlay file system to be presented to an operating system.

In other embodiments, a non-transitory computer-readable medium comprises instructions that when executed by the processing resource cause the processing resource to implement, in a storage node, a multi-tiered file system comprising a read-only layer that contains a base configuration for the storage node and a read-write layer that contains modifications to the base configuration; and combine the read-only layer and the read-write layer into an overlay file system to be presented to an operating system.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

As used herein, "compute load parameters" generally refers to performance, configuration and/or other system data of a processing device. Non-limiting examples of compute load parameters for a distributed computing system include latency, utilization, a number of input output operations per second (IOPS), a slice service (SS) load, Quality of Service (QoS) settings, or any other performance related information.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Data Processing Environment

FIG. 1 is a block diagram illustrating an environment 100 in which various embodiments may be implemented. In various embodiments described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on computer system 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a computer system 110, and a user 112. The data center 130, the cloud 120, and the computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a performance manager 138. Those of ordinary skill in the art will appreciate additional IT infrastructure would typically be part of the data center 130; however, discussion of such additional IT infrastructure is unnecessary to the understanding of the various embodiments described herein.

As illustrated in the embodiments shown in FIG. 1, the cluster 135 can include multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to hard disk drives, solid state drives, flash memory systems, or other storage devices.

A non-limiting example of a storage node 136 is described in further detail below with reference to FIG. 2.

Figure 2:
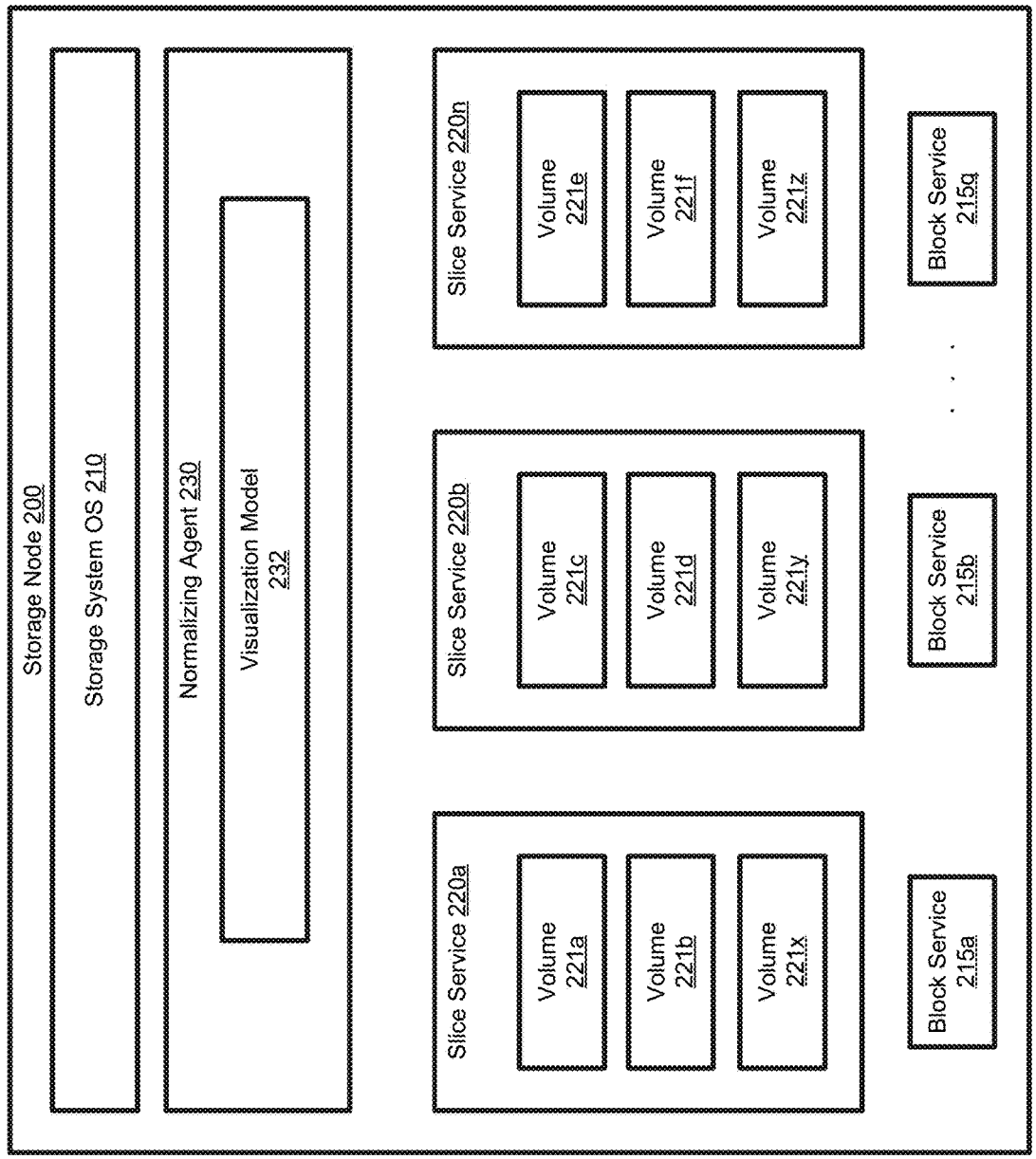
FIG. 2 is a block diagram illustrating a storage node in accordance with an embodiment of the present disclosure.

The API 137 may provide an interface through which the cluster 135 is configured and/or queried by external actors (e.g., the performance manager 138, the computer system 110, and a cloud-based, centralized normalizing agent (e.g., normalizing agent 230 shown in FIG. 2). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions.

Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storage node level, or the storage node component level).

In various embodiments, the storage node(s) 136a, 136b, 136n may comprise or be communicatively coupled to a performance manager 138. Performance manager 138 may be implemented locally within the same data center in which the cluster 135 resides as illustrated in FIG. 1. In other embodiments, performance manager 138 may be located external to cluster 135. Performance manager 138 can be configured to periodically poll and/or monitor for compute load parameters of the cluster 135 via the API 137. In some examples the polling may be performed on static periodic intervals. In other examples the polling interval may vary based upon one or more parameters (e.g., load, capacity, etc.). Depending upon the particular implementation, the polling may be performed at a predetermined or configurable interval (e.g., X milliseconds or Y seconds). The performance manager 138 may locally process and/or aggregate the collected compute load parameters (e.g., latency, utilization, IOPS, SS load, Quality of Service (QoS) settings, etc.) over a period of time by data point values and/or by ranges of data point values and provide frequency information regarding the aggregated compute load parameters retrieved from the cluster 135 to the normalizing agent 230.

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

Example Storage Node

FIG. 2 is a block diagram illustrating a storage node 200 in accordance with an embodiment of the present disclosure. Storage node 200 represents a non-limiting example of storage nodes 136a-n. In the context of the present example, storage node 200 includes a storage operating system 210, one or more slice services 220a-n, and one or more block services 215a-q. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

In some embodiments, the storage node 200 may comprise one or more centralized normalizing agents (e.g., normalizing agent 230). The normalizing agent 230 may receive (e.g., periodically, continuously, or on a set schedule) monitored information, including raw and/or processed compute load parameters (e.g., data representing aggregated compute load parameters over time) of multiple clusters (e.g., cluster 135 in FIG. 1) from multiple distributed performance managers (e.g., performance manager 138 in FIG. 1) operable within respective data centers (e.g., data center 130 in FIG. 1) of one or more customers of the managed service provider. Depending upon the particular implementation, the monitored information may be pushed from the performance manager 138 or pulled from the performance manager 138 in accordance with a monitoring schedule or responsive to an event (e.g., a request issued by user 112 to the normalizing agent 230).

In some examples aggregating compute load parameters may be accomplished by combining all the various compute load parameters into a single "load" parameter for use in determining how to throttle various subsystem processes. For example, a scale that measures between 0-100 may be used to represent latency, where 1 ms client latencies equate to a load of 50 on said scale. Such a parameter can then be aggregated with another compute load parameter, cache fullness, that is easily represented on a scale that represents the cache capacity (e.g., a 0-100% fullness scale).

Each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 215a-q and slice services 220a-n may maintain mappings between an address of the client system and the eventual physical location of the data block in respective storage media of the storage node 200. In one embodiment, volumes 221a-z include unique and uniformly random identifiers to facilitate even distribution of a volume's data throughout a cluster (e.g., cluster 135). The slice services 220a-n may store metadata that maps between client systems and block services 215. For example, slice services 220a-n may map between the client addressing used by the client systems (e.g., file names, object names, block numbers, etc. such as Logical Block Addresses (LBAs)) and block layer addressing (e.g., block identifiers) used in block services 215. Further, block services 215a-q may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220a-n and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

As noted above, in some embodiments, a performance manager module (e.g., performance manager 138 shown in FIG. 1) may poll an API (e.g., API 137 shown in FIG. 1) of a distributed storage system (e.g., cluster 135 shown in FIG. 1) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136a-n), individual or groups of volumes 221, individual or groups of slice services 220, and/or individual or groups of block services 215.

The storage nodes (e.g., storage nodes 136a-n and storage node 200), the performance manager (e.g., performance manager 138) and the monitoring system (e.g., normalizing agent 230) described herein, and the processing described below with reference to the flow diagram of FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 5, below.

Example Storage System

Figure 3A:
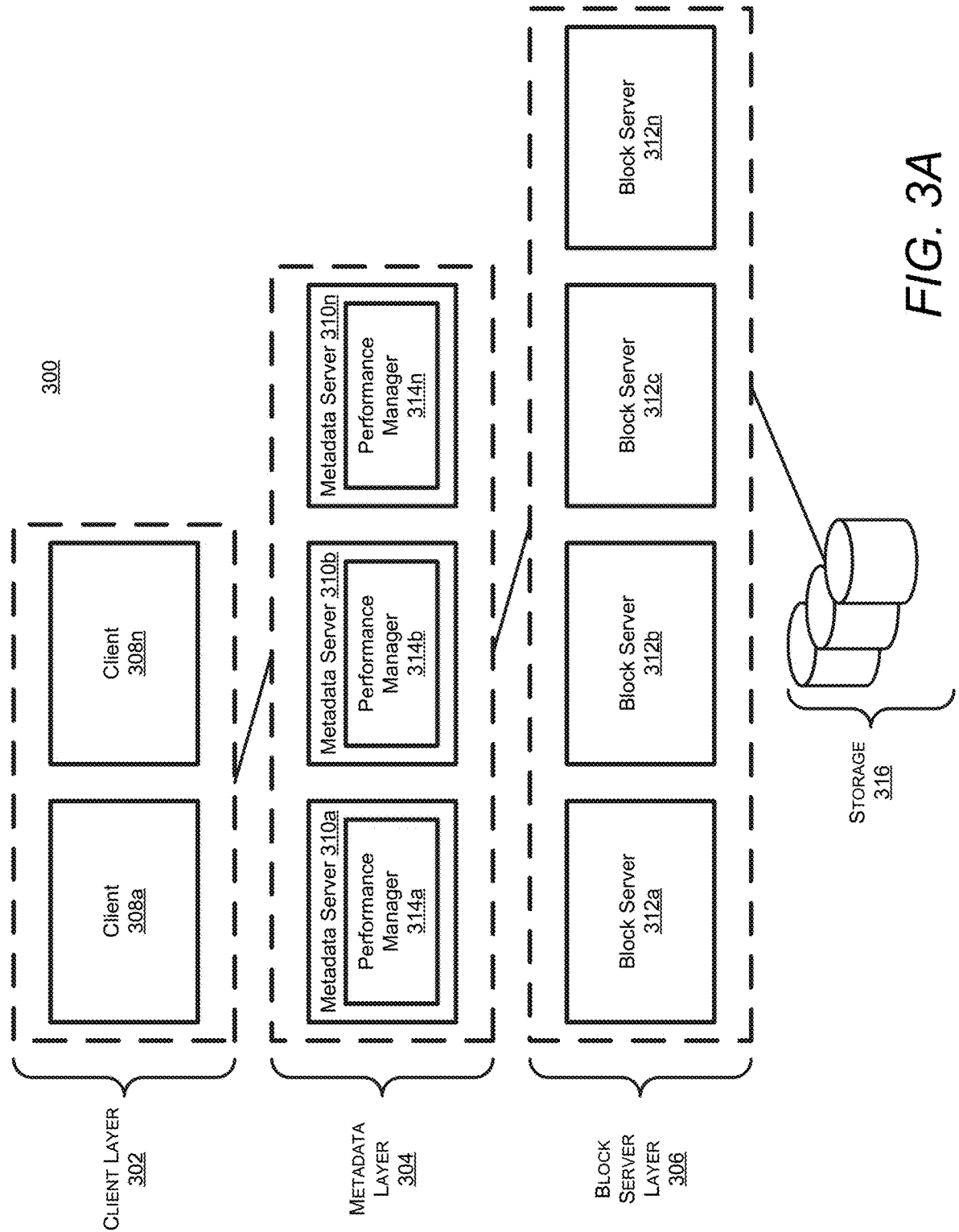
FIG. 3A is a block diagram of a storage system in accordance with an embodiment of the present disclosure.

FIG. 3A depicts a simplified system for centralized QoS management in a storage system 300 in accordance with an illustrative implementation. Storage system 300 includes a client layer 302, a metadata layer 304, a block server layer 306, and storage 316.

Before discussing how particular implementations perform centralized QoS management, the structure of a possible system is described. Client layer 302 includes one or more clients 308a-n. Clients 308a-n include client processes that may exist on one or more physical machines. When the term "client" is used in the disclosure, the action being performed may be performed by a client process. A client process is responsible for storing, retrieving, and deleting data in system 300. A client process may address pieces of data depending on the nature of the storage system and the format of the data stored. For example, the client process may reference data using a client address. The client address may take different forms. For example, in a storage system that uses file storage, each of clients 308a-n may reference a particular volume or partition, and a file name With object storage, the client address may be a unique object name. For block storage, the client address may be a volume or partition, and a block address. Clients 308a-n can communicate with metadata layer 304 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Metadata layer 304 includes one or more metadata servers 310a-n. Performance managers 314a-n may be located on metadata servers 310a-n. Block server layer 306 includes one or more block servers 312a-n. Block servers 312a-n are coupled to storage 316, which stores volume data for clients 308a-n. Each client 308a-n may be associated with a volume. In one implementation, only one client 308a-n may access data in a volume; however, multiple clients 308a-n may access data in a single volume.

Storage 316 can include multiple solid-state drives (SSDs). In one implementation, storage 316 can be a cluster of individual drives coupled together via a network. When the term "cluster" is used, it will be recognized that cluster may represent a storage system that includes multiple disks that may not be networked together. In one implementation, storage 316 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 316 is based upon breaking data up into one or more storage units, e.g., data blocks. A data block, therefore, is the raw data for a volume and may be the smallest addressable unit of data. The metadata layer 304 or the client layer 302 can break data into data blocks. The data blocks can then be stored on multiple block servers 312a-n. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 302 and/or metadata layer 304. Also, compression may occur in client layer 302, metadata layer 304, and/or block server layer 306.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved since data for each client is spread evenly through the drives. Accordingly, a client's 110 will involve all the drives in the cluster. Since all clients have their data spread substantially evenly through all the drives in the storage system, a performance of the system can be described in aggregate as a single number, e.g., the sum of performance of all the drives in the storage system.

Block servers 312a-n and slice servers 324 (FIG. 3B) maintain a mapping between a block identifier and the location of the data block in a storage medium of block server 312. A volume includes these unique and uniformly random identifiers, and so a volume's data is also evenly distributed throughout the cluster.

Metadata layer 304 stores metadata that maps between client layer 302 and block server layer 306. For example, metadata servers 310 map between the client addressing used by one or more clients 308a . . . nn (e.g., file names, object names, block numbers, etc.) and block layer addressing (e.g., block identifiers) used in block server layer 306. Clients 308a . . . n may perform access based on client addresses. However, as described above, block servers 312 store data based upon identifiers and do not store data based on client addresses. Accordingly, a client can access data using a client address which is eventually translated into the corresponding unique identifiers that reference the client's data in storage 316.

Although the parts of system 300 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 310 may be combined with one or more block servers 312 in a single machine. Entities in system 300 may be virtualized entities. For example, multiple virtual block servers 312 may be included on a machine. Entities may also be included in a cluster, where computing resources of the cluster are virtualized such that the computing resources appear as a single entity.

Figure 3B:
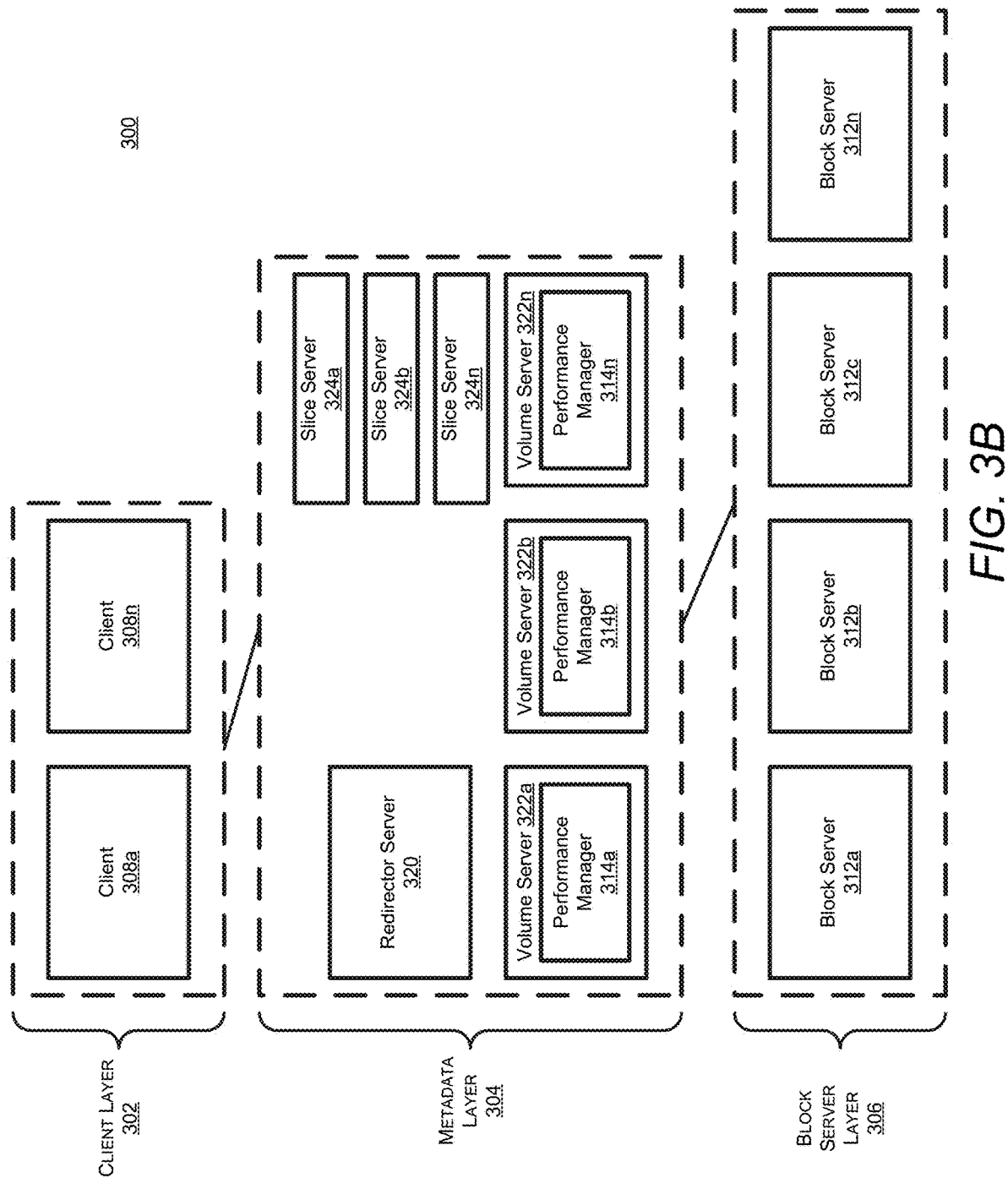
FIG. 3B is a more detailed block diagram of a storage system in accordance with an embodiment of the present disclosure.

FIG. 3B depicts a more detailed example of system 300 according to one implementation. Metadata layer 304 may include a redirector server 320 and multiple volume servers 322. Each volume server 322 may be associated with a plurality of slice servers 324.

In this example, client 308a wants to connect to a volume (e.g., client address). Client 308a communicates with redirector server 320, identifies itself by an initiator name, and also indicates a volume by target name that client 308a wants to connect to. Different volume servers 322 may be responsible for different volumes. In this case, redirector server 320 is used to redirect the client to a specific volume server 322. To client 308, redirector server 320 may represent a single point of contact. The first request from client 308a then is redirected to a specific volume server 322. For example, redirector server 320 may use a database of volumes to determine which volume server 322 is a primary volume server for the requested target name. The request from client 308a is then directed to the specific volume server 322 causing client 308a to connect directly to the specific volume server 322. Communications between client 308a and the specific volume server 322 may then proceed without redirector server 320.

Volume server 322 performs functions as described with respect to metadata server 310. Additionally, each volume server 322 includes a performance manager 314. For each volume hosted by volume server 322, a list of block identifiers is stored with one block identifier for each logical block on the volume. Each volume may be replicated between one or more volume servers 322 and the metadata for each volume may be synchronized between each of the volume servers 322 hosting that volume. If a volume server 322a . . . n fails, redirector server 320 may direct a client 308a . . . n to an alternate volume server 322a . . . n.

In one implementation, the metadata being stored on volume server 322 may be too large for one volume server 322. Thus, multiple slice servers 324 may be associated with each volume server 322. The metadata may be divided into slices and a slice of metadata may be stored on each slice server 324. When a request for a volume is received at volume server 322, volume server 322 determines which slice server 324 contains metadata for that volume. Volume server 322 then routes the request to the appropriate slice server 324. Accordingly, slice server 324 adds an additional layer of abstraction to volume server 322.

The above structure allows storing of data evenly across the cluster of disks. For example, by storing data based on block identifiers, data can be evenly stored across drives of a cluster. As described above, data evenly stored across the cluster allows for performance metrics to manage load in system 300. If the system 300 is under a load, clients can be throttled or locked out of a volume. When a client is locked out of a volume, metadata server 310 or volume server 322 may close the command window or reduce or zero the amount of read or write data that is being processed at a time for a client 308a . . . n. The metadata server 310 or the volume server 322a . . . n can queue access requests for client 308a . . . n, such that IO requests from the client 308a . . . n can be processed after the client's access to the volume resumes after the lock out period.

In some examples, the storage system 300 can also include one or more performance managers 314a . . . n that can monitor the use of the storage system's resources by both client processes and background processes. In addition, a performance manager 314*a* . . . *n* can facilitate regulating use of the storage system 300 by both client processes and background processes. The use of the storage system can be adjusted based upon performance metrics, the client's quality of service parameters, and the load of the storage system. Performance metrics are various measurable attributes of the storage system.

Universal Return to Factory Image (RTFI)

As mentioned above, the phrase return to factory image (RTFI) refers to the installation of operating system software components onto the memory of electronic devices. For example, some storage devices implement an RTFI process to install one or more operating system components onto a blank storage node, or to update or replace one or more operating system components on an existing installed storage node. In a traditional RTFI process, for example an installation from bootable media such as optical disk (ISO), pre-boot execution environment (PXE) or a thumb drive. In a traditional RTFI (tRFTI), the entire disk is re-partitioned and disk partitions new filesystems are created for the respective disk partitions. This process destroys most existing data on the disk, though some data can be persisted from a previously installed system. An "Inplace" RTFI process (iRFTI), is an updated process from a running system that tries to minimize install time by using kexec rather than a cold boot where possible. In an iRTFI the root filesystem partition is recreated while other partitions are left intact.

Described herein are techniques referred to as a "universal" RFTI process (uRFTI). In some embodiments a uRTFI process utilizes elements of both tRTFI processes and iRTFI processes to provide a simplified method of managing the core platform and configuration changes through the use of an overlay file system. As such, it will not affect the majority of RTFI processing, yet simplifies installation of new core platform images and management of associated backups.

Partitions and Filesystems

Figure 4:
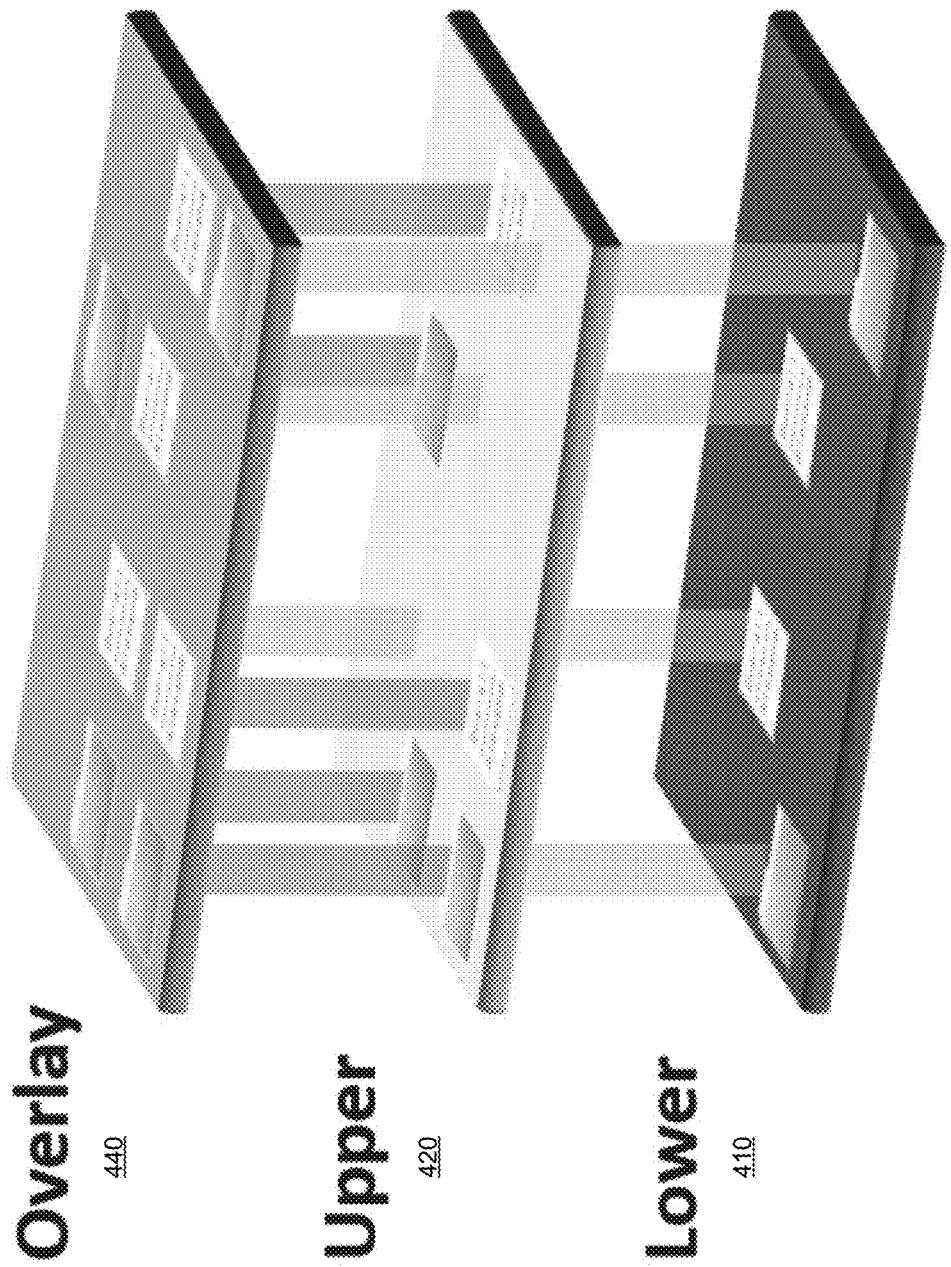
FIG. 4 illustrates an example file system structure in which or with which embodiments of the present disclosure may be utilized.

Referring to FIG. 4, in some embodiments a filesystem structure 400 comprises an overlay filesystem 440, which in turn comprises a read-only layer 410 (indicated as the lower layer) with a read-write layer 420 above it (indicated as the upper layer). In some embodiments, the read-only layer 410 comprises the platform distribution, while the read-write layer 420 contains modifications to the read only layer, for example network configuration changes. Thus, the original distribution remains unmodified because changes to it are isolated to the read-write layer for the purposes of backup. Additionally, the overlay filesystem 440 makes the two layers transparently appear as a single directory structure to any application using it.

In some embodiments the read-only layer 410 in an overlay filesystem 440 can reside on media which is read-only media. In other embodiments the read-only layer filesystem 410 can reside on media which is not, in fact, read-only media, but which is treated by the overlay file system 440 as read only media. In some embodiments, one or more filesystems may be implemented by a squashfs, which is a highly compressed, read-only filesystem-in-a-file supported by the operating system kernel directly that is generated by a build process. In FIG. 4, the read-only layer 410 represents the squashfs. The read-write layer 420 represents a directory on the disk, and is persistent. The overlay layer 440 (also referred to the presentation layer) is the layer that the system uses and represents the top of the root filesystem. The build process generates a squashfs image (i.e., a single file) of the operating system. This squashfs image is used as a source archive during an initial installation and during an upgrade and/or downgrade. The file contents are extracted from the squashfs during the RTFI processes.

In some embodiments a uRTFI uses the squashfs image as the read-only layer 410 of an overlay file system, without extracting its contents. This simplifies the components of the RTFI process that are error prone (e.g., backup, imaging, and rollback).

In some embodiments, approximately five percent of the boot disk is allocated for the boot partition using an ext2 filesystem type, approximately seventy five percent of the boot disk is allocated for the root filesystem and twenty percent is allocated for /var/log, both using ext4. Further, in a uRTFI process the partitions and filesystems are created during initial install and are left alone during subsequent upgrades and downgrades. The boot disk need not contain a full Linux root file system. Instead, the root partition on that disk may be used for storage of squashfs images and the space and directories needed by the overlay filesystem. Changing versions of the kernel, Ember and/or Element is performed by providing a new squashfs image containing the new root file system. The read-write layer of the overlayfs will contain all runtime data including (but not limited to): linux configuration files, cluster node state information, support bundles, core files, and crashdumps.

In some embodiments the boot is the first partition on the disk and contains the kernel, the initramfs, the bootloader, the kernel symbol map, and a kernel microcode patch. These files may also be contained in the/boot directory inside the squashfs. The boot partition may also have a subdirectory for the currently active boot files and symbolic links that make it possible for the bootloader to operate without modification. On some compute nodes, boot also contains several ESX ISO images. These images will live in the currently active directory with symlinks provided as needed for use by the bootloader.

During an upgrade, a secondary directory is created and populated with the boot files and symlinks required to boot to a new universal RTFI kernel. A staging operation sets this secondary directory as the new current active image and the old current as the previous image. A soft reboot (i.e., kexec) is performed and the initramfs' init script mounts the new image as the active overlay and then calls the sfrtfi script to complete configuration updates in the new image. If a rollback is required, the previous image is booted as the new current image and the secondary directory is cleaned up. On a successful upgrade the previous image directory (i.e., the old image) is cleaned up during the post-install phase.

In some embodiments, the root partition contains the entire runtime and all applications. This is a copy of the squashfs created by the build system extracted to disk. After the transition to a uRTFI the root partition will appear as the presentation layer of the overlayfs, with the squashfs mounted as the lower layer and bind mounts of real partitions in the presentation layer as needed to support iRTFI operations. A control file may be used to manage iRTFI operations and will consist of a list of key/value pairs that control what the initramfs (e.g., via its embedded init script) does. This includes which boot files and squashfs to use and processing required by RTFI operations such as downgrading to a pre-universal RTFI release.

In some embodiments the log partition comprises all the logs the system generates. In an iRTFI using pre-universal RTFI images, the log partition contains a compressed backup of the entire root partition and a copy of the bootloader in order to support rollback, if needed. The log partition is a small partition on some nodes and the backups of the root partition can be large. If there isn't enough space to hold all the logs, the backup of the root partition, and the bootloader, the RTFI will fail and will rollback to the old version. The rollback may or may not be noticed by orchestrations systems, which will call this an RTFI failure.

In some embodiments, a secondary initramfs is appended to the initial initramfs. The secondary initramfs comprises a custom init script and configuration information required to access the local boot drive partitions. The init script is purposely kept minimal, with as much staging work as possible performed in a running system. This prevents long down times and limits points of failure in the init script. The custom init script is needed to support mounting the overlay from the contents of the boot drive.

State Transitions

Figure 5:
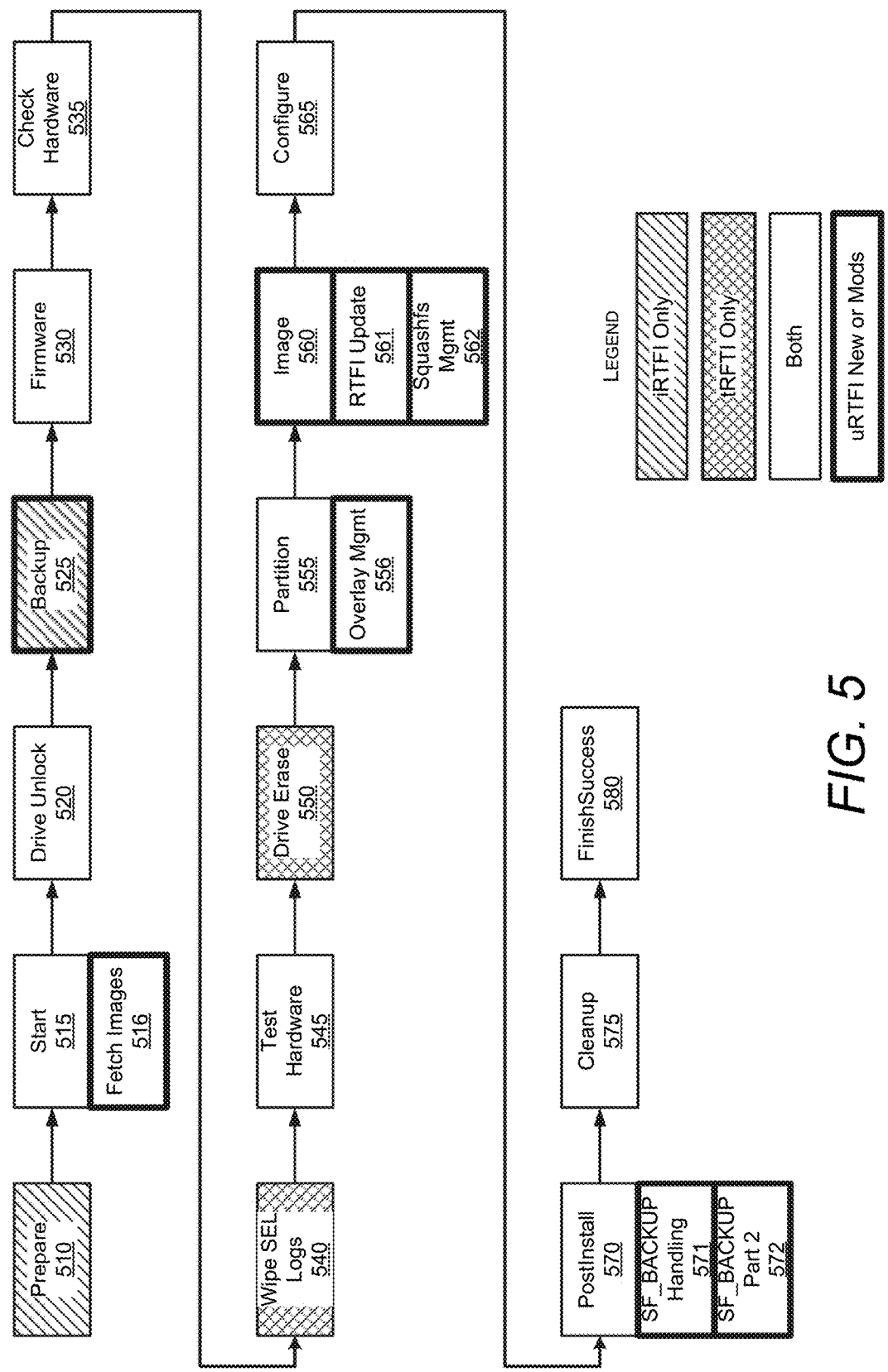
FIG. 5 is a flow diagram illustrating state transitions and component level details in a universal RTFI process, according to embodiments.

FIG. 5 shows state transitions and component level details for the current (pre-uRTFI) RTFI implementation covering both tRTFI and iRTFI with uRTFI updates. Blocks along the top of the diagram represent RTFI states. Blocks in diagonal hashes are only processed in tRTFI mode. Blocks in cross hashes are only processed in iRTFI mode. All other states are common to both modes.

At block 510 a preparation state is entered. In the start state 515, uRTFI will fetch one or more images 516 including core platform (squashfs) images and RTFI update packages. At block 520 the drive is unlocked. At block 525 the Backup state is modified and greatly simplified for iRTFI operations involving transitions from uRTFI to uRTFI releases. Backups for iRTFI operations for uRTFI to pre-uRTFI and pre-uRTFI to uRTFI still occur as they have in the past. This is because pre-uRTFI releases do not have knowledge of the new on-disk layout introduced by uRTFI. At block 530 firmware is installed, and at block 535 a hardware check operation is performed. At block 540 the system event log (SEL) logs are wiped and at block 545 a hardware test is performed. At operation 550 the drive is erased.

At block 555, in the Partition state for uRTFI, the partitions remain the same but are used within an overlay management system 556. This allows the core platform to be replaced quickly and simply without having to deal with unpacking of the image. Additionally, the use of an overlay management system 556 simplifies restoration of run time configurations. Overlay management is setup as part of the staging that occurs in the running uRTFI image. The initramfs boots the configuration defined by that staging process.

At block 560, the image state holds the most changes for uRTFI. The need to uncompress an image is replaced by RTFI package update 561 and squashfs and bank management code 562. At block 560 a configure operation is implemented.

At block 570, in an iRTFI, restoring backups in the PostInstall state will change to support the simplified backup handling 571, 572 introduced with the use of the overlayfs system. At block 575 a cleanup operation is performed and at block 580 the process is finished.

In some embodiments, upgrading a version (e.g., operating system and firmware versions) in a storage node comprises transferring a new squashfs to the node, configuring the node to use it and performing a soft reboot (e.g., via a kexec call). This enables the ability to stage cluster upgrades without affecting the cluster's operation and allows for the upgrade of each node in turn (i.e., kexec each node and wait for cluster faults to clear. In some embodiments of uRTFI, a rollback may be implemented by resetting symlinks for the boot, log and overlay directories and then booting into the rollback script of the original image. In some embodiments use file/dir names to denote current and previous versions.

Installation to Blank Node

Figure 6:
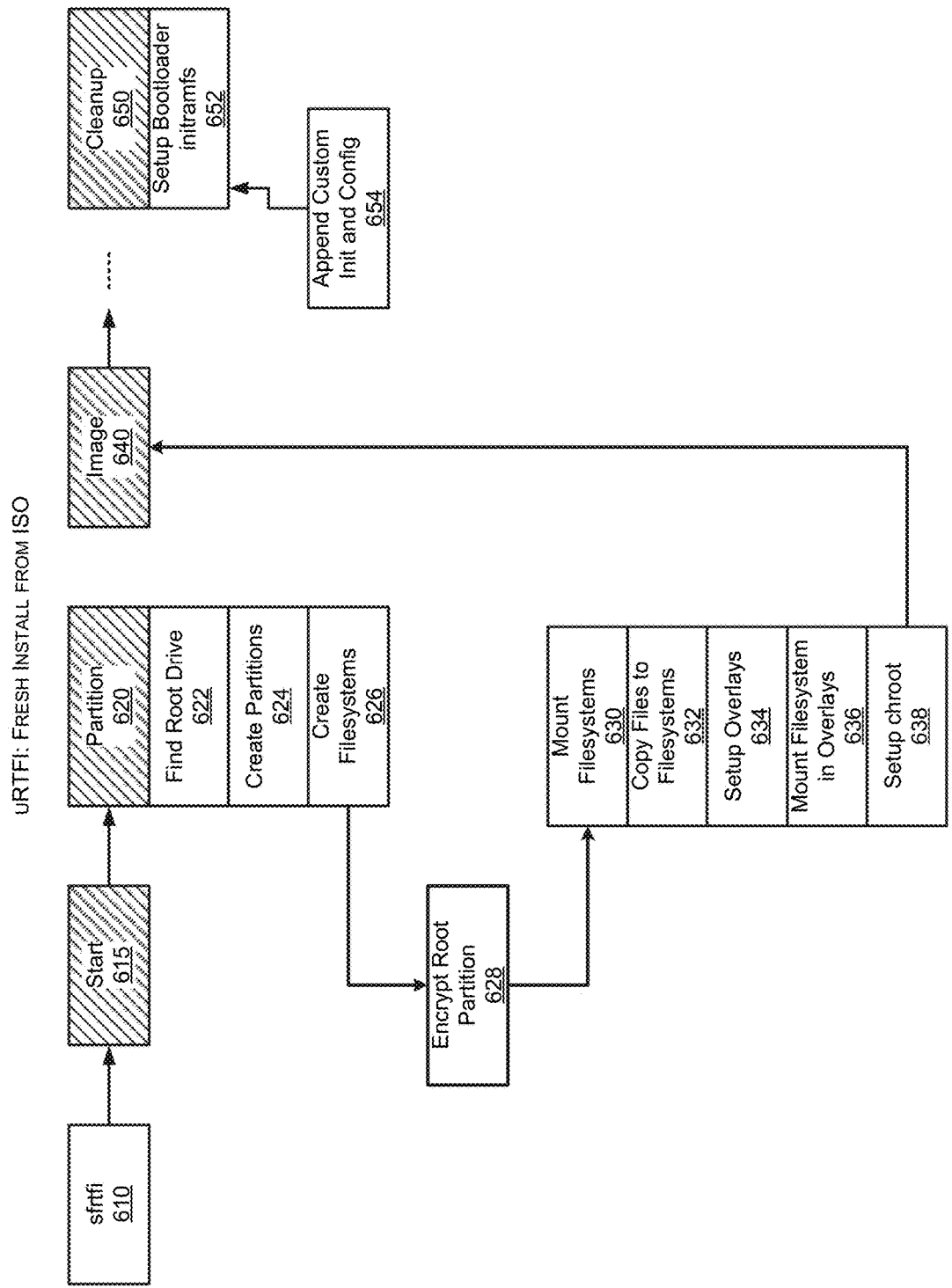
FIG. 6 is a flow diagram illustrating operations in an install process, according to embodiments.

FIG. 6 is a flow diagram illustrating operations in an install process, according to embodiments. Referring to FIG. 6, in some examples an ISO (or similar) image 610 is booted to Linux with RTFI as the initial process. The install starts at block 615, and at block 620 the RTFI process checks for partitions on the root drive. In some examples the RTFI process finds the root drive at block 622, creates one or more partitions at block 624, and creates one or more filesystems at block 626. Optionally, the root partition may be encrypted at block 628.

At block 630 the filesystems created at block 626 are mounted and at block 632 one or more files are copied to the filesystems. At block 634 one or more overlays are set up, and at block 636 a file system is mounted in the one or more overlays. At block 638 the root director is changed to point to the image 640. At block 650 a cleanup operation is implemented, which may include setting up a bootloader initramfms at block 652 and appending a custom initialization and config file at block 654.

In some embodiments, the uRTFI process separates the process of configuration of a running system from the installation or upgrade of that system. Existing configuration operations are specific state changes to an installed system and can therefore be called separate from the installation of the core components. There is no need to reparation the boot drive since its contents are more easily and quickly updated with uRTFI. There is limited need for a backup, as the data to be backed up with uRTFI is now limited only to changed files and not the entire root file system. A uRTFI rollback comprises kexecing to the previous squashfs and the associated overlay. Since this is not destroyed or modified by the upgrade process before the upgrade completes successfully the rollback is nearly immediate and cleanup fast.

Upgrade/Downgrade uRTFI Version

Figure 7:
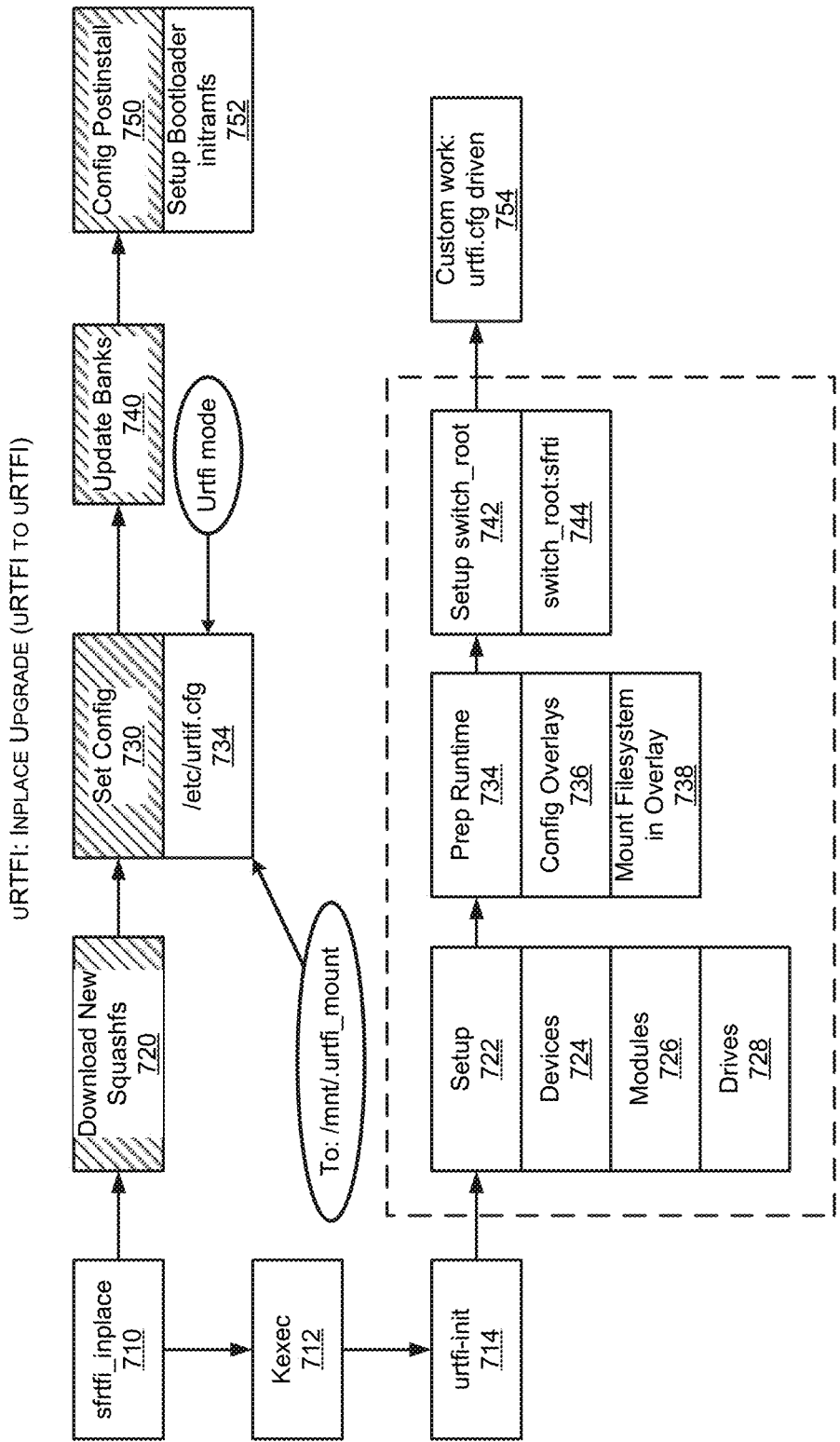
FIG. 7 is a flow diagram illustrating operations in an install upgrade/downgrade process, according to embodiments.

FIG. 7 is a flow diagram illustrating operations in an install upgrade/downgrade process, according to embodiments. Referring to FIG. 7, at block 710 an iRTFI operation is started to switch from version X to version Y. At block 720 the Y version squashfs is downloaded to a running system. At block 730 the uRTFI config file is updated and at block 740 bank switching is configured to point to the new squashfs and kernel.

At block 712 RTFI then kexecs to the init script at block 714 in the new image. At block 722 a setup is performed to identify devices 724, modules 726 and drives 728. At block 734 the runtime is prepared, and at block 736 one or more overlays are configured and at block 738 a file system is mounted in the overlay. At block 742 a switch_root is setup and at block 744 the switch_root to the overlay's presentation layer is executed.

At block 750 post install handling is run in the new image, and at block 752 a bootloader for initramfs is setup. Any further custom work is performed at block 754.

Figure 8:
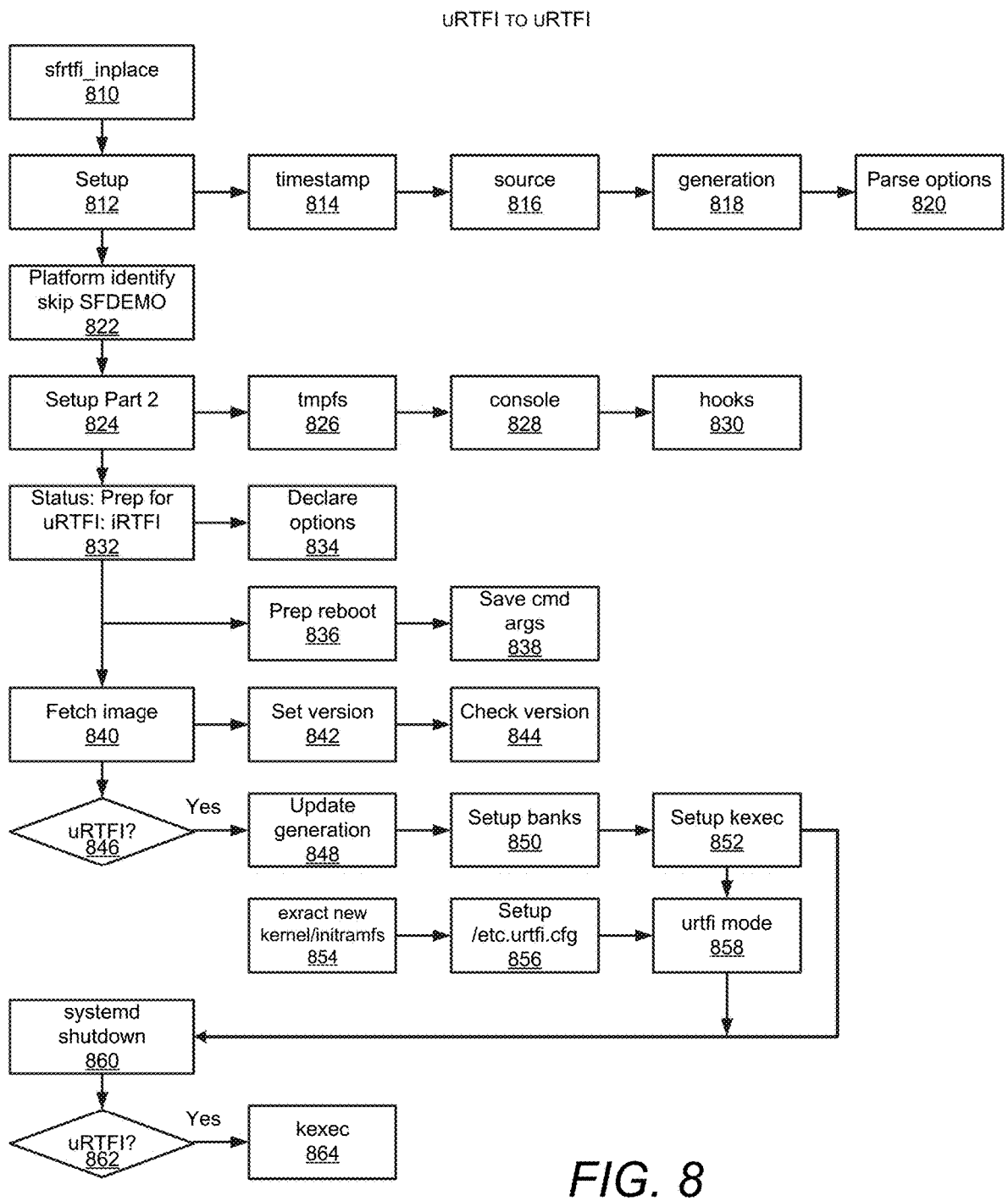
FIG. 8 is a flow diagram illustrating operations in an install upgrade/downgrade process, according to embodiments.

FIG. 8 is a flow diagram illustrating operations in an install upgrade/downgrade process, according to embodiments. Referring to FIG. 8, at block 810 an iRTFI operation is started. At block 812 a setup operation is started to generate a timestamp 814, a source 816, a generation, and to identify one or more parse options 820. At block 822 a platform identify operation is implemented. At block 824 a second setup operation is started to identify the temporary file storage paradigm (tmpfs) 826, a console 828, and one or more hooks 830. At block 832 a preparation operation is conducted and at block 834 options are declared. At block 836 a reboot is prepared and at operation 838 command arguments are saved.

At block 840 an image of the filesystem is fetched, at block 842 the version is set, and at block 844 the version is checked. If, at block 846, the update is a uRFTI, then at block 848 the generation of the filesystem is updated. At block 850 the banks are setup and at block 852 the kexec is setup. At operation 854 new kernel and/or initramfs is extracted and at block 856 a new config file for a uRFTI is setup. At block 858 the mode is set to uRFTI. At operation 860 a systemd shutdown is implemented. If, at block 862 the update is a uRFTI then at operation 864 a kexec is implemented.

uRTFI Node Reset

Figure 9:
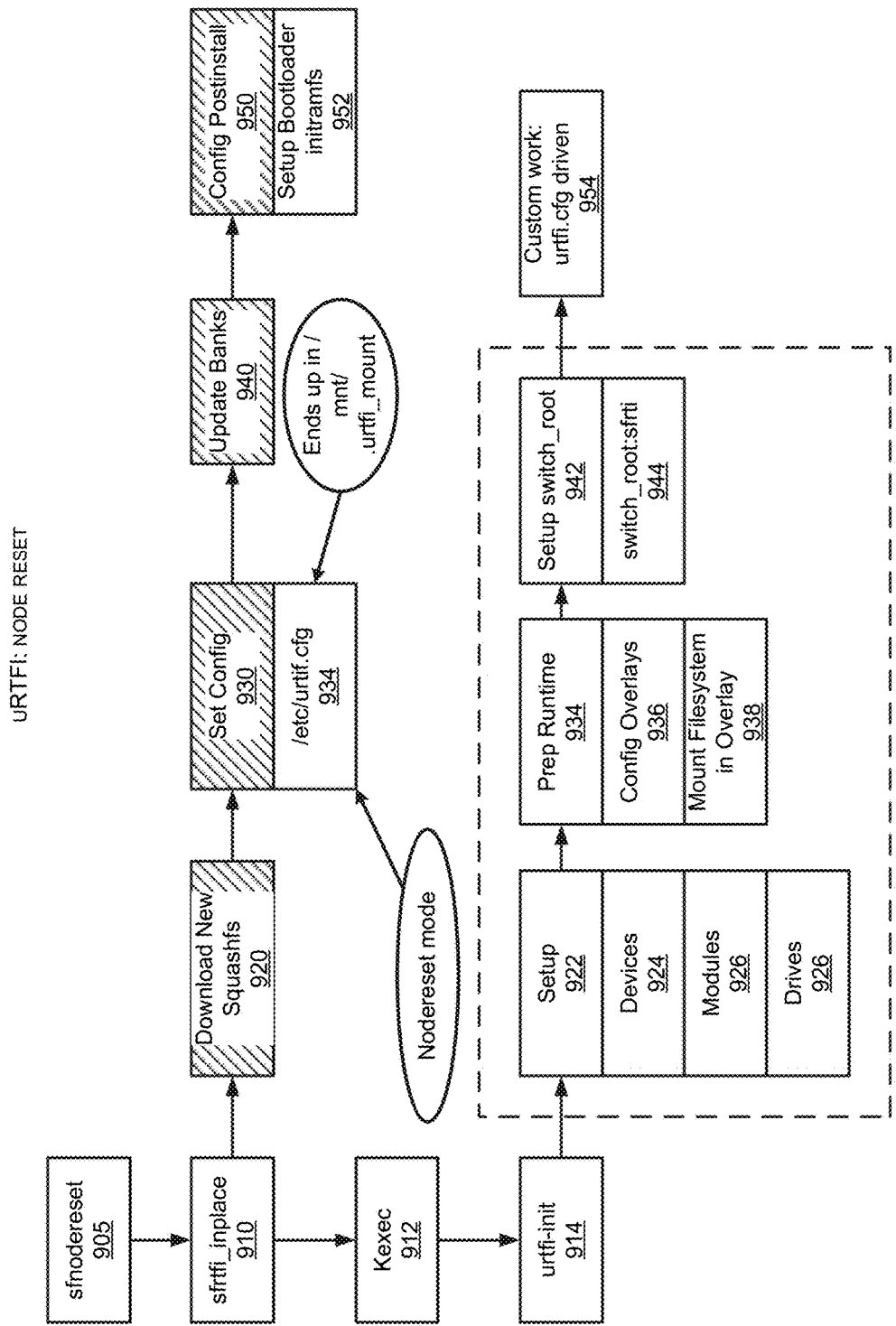
FIG. 9 is a flow diagram illustrating operations in an uRFTI node reset process, according to embodiments.

FIG. 9 is a flow diagram illustrating operations in a uRFTI node reset process, according to embodiments. Referring to FIG. 9, at block 905 a sfnodereset operation is initiated. At block 910 a sfrfti_inplace operation is initiated. At block 920 a new squash file system is downloaded. At block 930 the uRTFI config file 934 is set and at block 940 banks are updated.

At block 912 RTFI then kexecs to the init script at block 914 in the new image. At block 922 a setup is performed to identify devices 924, modules 926 and drives 928. At block 934 the runtime is prepared, and at block 936 one or more overlays are configured and at block 938 a file system is mounted in the overlay. At block 942 a switch_root is setup and at block 944 the switch_root is executed At block 950 post install handling is run in the new image, and at block 952 a bootloader for initramfs is setup. Any further custom work is performed at block 954.

Figure 10:
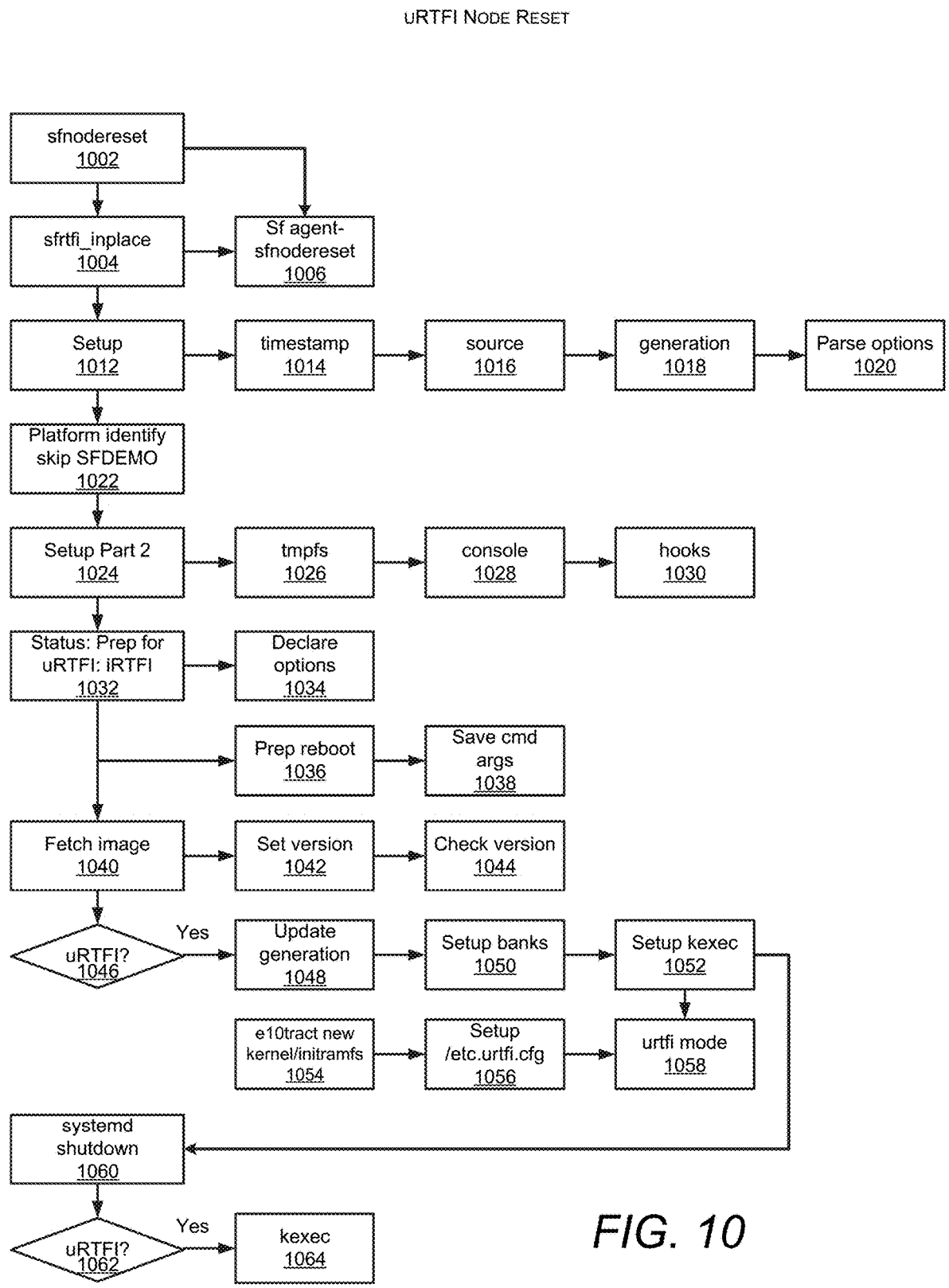
FIG. 10 is a flow diagram illustrating operations in a uRFTI node reset process, according to embodiments.

FIG. 10 is a flow diagram illustrating operations in a uRFTI node reset process, according to embodiments. Referring to FIG. 10, at block 1002 a sfnodereset operation is started. At block 1004 a sfrtfi_inplace operation is implemented and at operation 1006 a sf agent-sfnodereset operation is implemented. At block 1012 a setup operation is started to generate a timestamp 1014, a source 1016, a generation 1018, and to identify one or more parse options 1020. At block 1022 a platform identify operation is implemented. At block 1024 a second setup operation is started to identify the temporary file storage paradigm (tmpfs) 1024, a console 826, and one or more hooks 1028. At block 1032 a preparation operation is conducted and at block 1034 options are declared. At block 1036 a reboot is prepared and at operation 1038 command arguments are saved.

At block 1040 an image of the filesystem is fetched, at block 1042 the version is set, and at block 1044 the version is checked. If, at block 1046, the update is a uRFTI, then at block 1048 the generation of the filesystem is updated. At block 1050 the banks are setup and at block 1052 the kexec is setup. At operation 1054 new kernel and/or initramfs is extracted and at block 1056 a new config file for a uRFTI is setup. At block 1058 the mode is set to uRFTI. At operation 1060 a systemd shutdown is implemented. If, at block 1062 the update is a uRFTI then at operation 1064 a kexec is implemented.

uRTFI Inplace Upgrade: Pre-uRTFI to uRTFI

Figure 11:
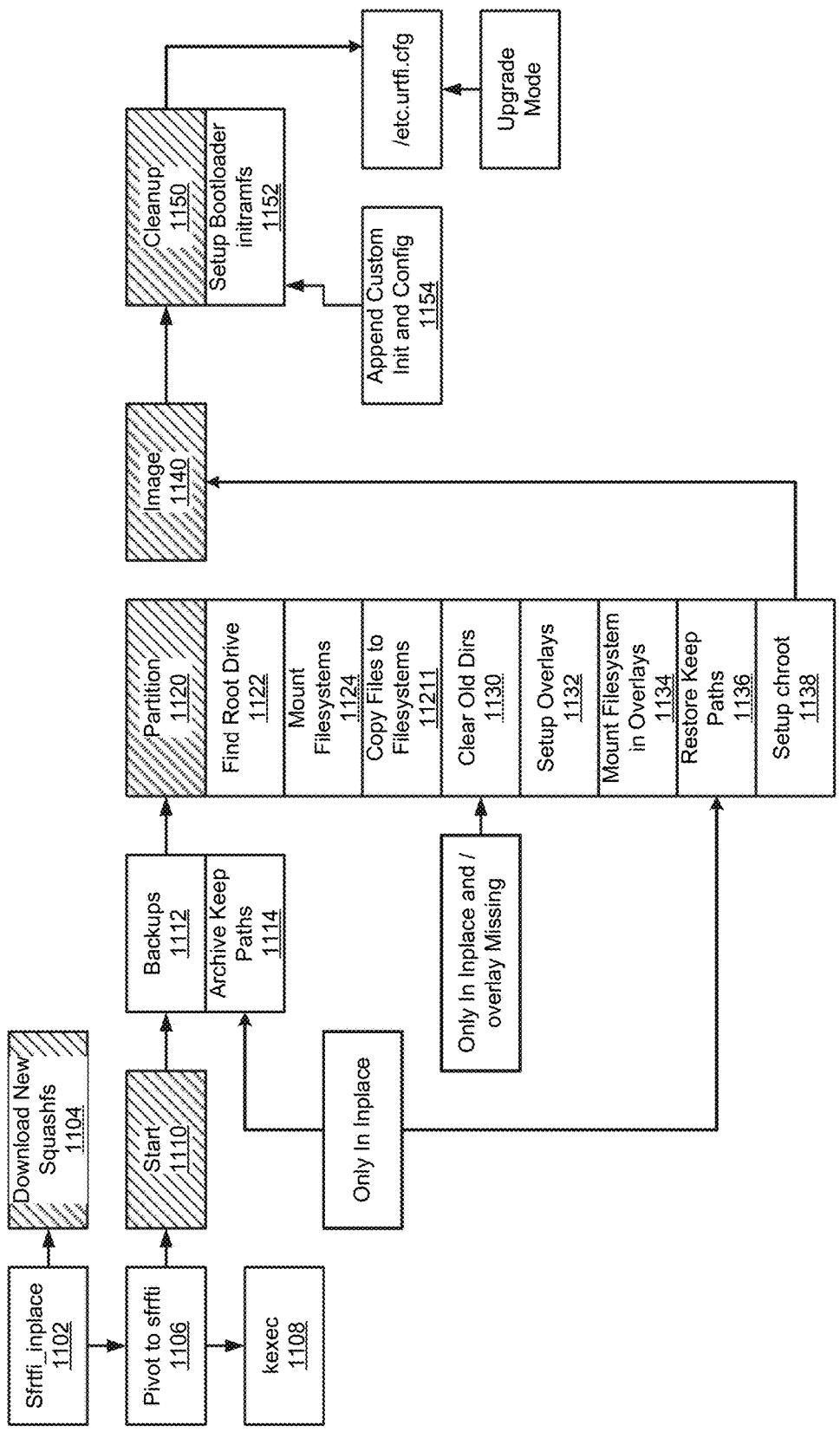
FIG. 11 is a flow diagram illustrating operations in an upgrade process, according to embodiments.

FIG. 11 is a flow diagram illustrating operations in an upgrade process, according to embodiments. Referring to FIG. 11, in some embodiments an sfrtfi_inplace operation is initiated at block 1102. At block 1104 a new squashfs is downloaded. At block 1106 the process pivots to an sfrtfi and at block 1108 a kexec is executed. The install starts at block 1110. At block 1112 one or more backups are generated and at block 1114 one or more keep paths are archived. At block 1120 the RTFI process checks for partitions on the root drive. In some examples the RTFI process finds the root drive at block 1122, mounts one or more filesystems at block 1124, and one or more filed are copied to the filesystems at block 1126.

At block 1130 old directories are cleared and at block 1132 one or more overlays are set up, and at block 1134 a file system is mounted in the one or more overlays. At block 1136 the keep paths archived in block 1114 are restored and at the root directory is changed to point to the image 1140. At block 1150 a cleanup operation is implemented, which may include setting up a bootloader initramfms at block 1152 and appending a custom initialization and config file at block 1154.

uRTFI Inplace Downgrade

Figure 12:
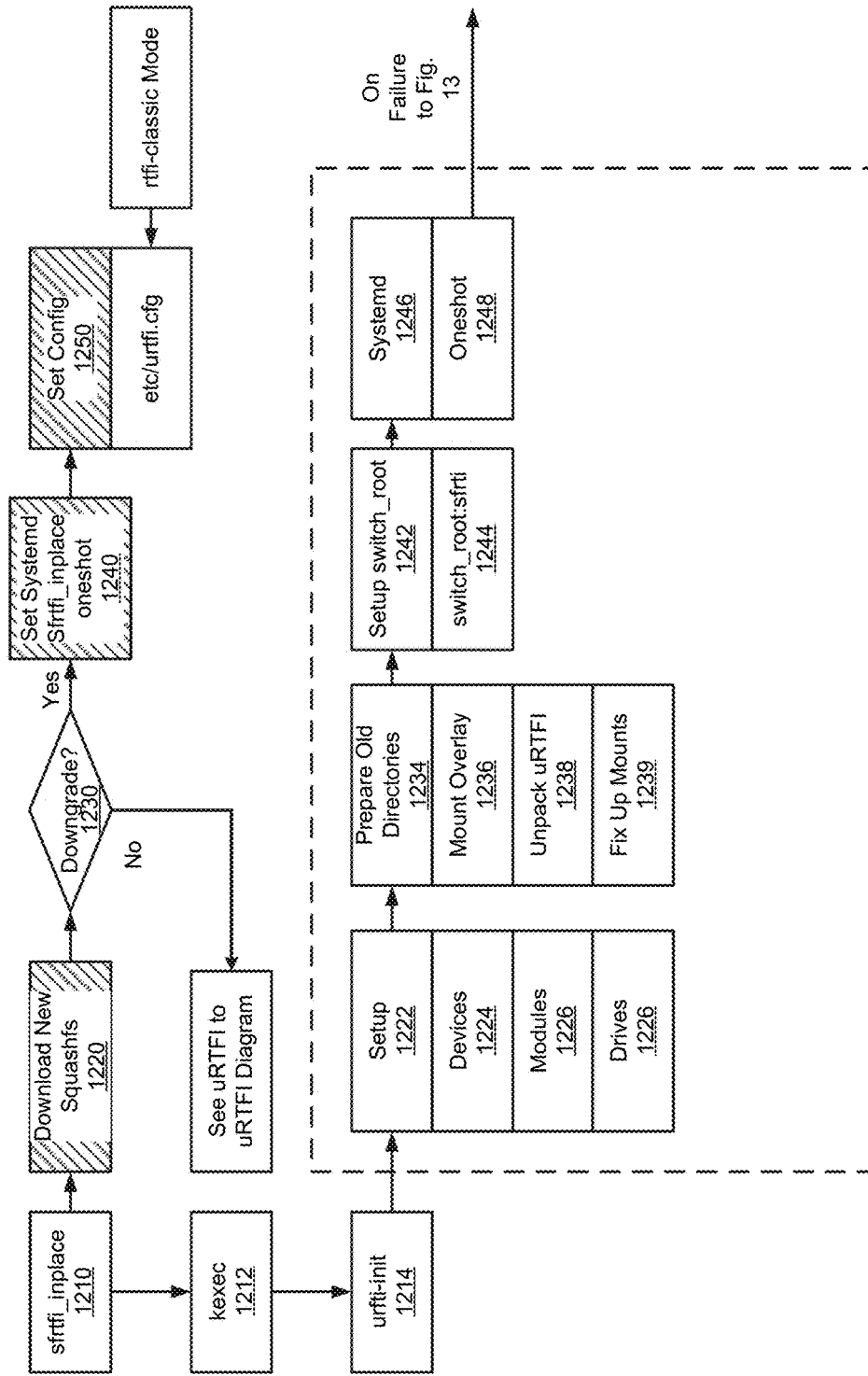
FIG. 12 is a flow diagram illustrating operations in a downgrade process, according to embodiments.
Figure 13:
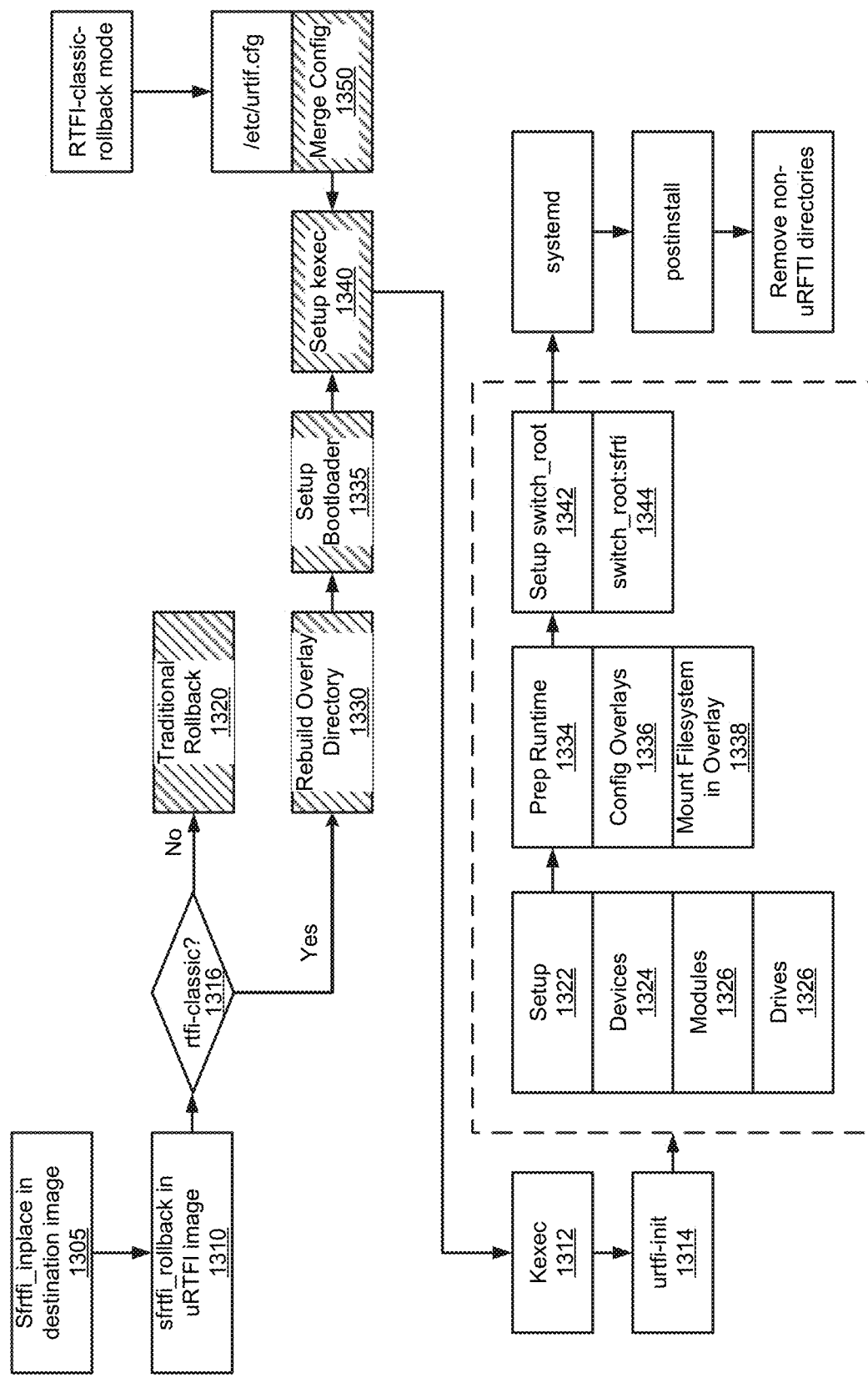
FIG. 13 is a flow diagram illustrating operations in a downgrade process, according to embodiments.

FIGS. 12-13 are flow diagrams illustrating operations in a downgrade process, according to embodiments. Referring to FIG. 12, at block 1210 a sfrtifi_inplace operation is initiated. At block 1220 the Y version squashfs is downloaded to a running system. If, at block 1230, this is not a downgrade process then a uRFTI to uRFTI process is initiated as described with reference to FIG. 8. By contrast, if at block 730 this is a downgrade process then at block 1214 the system is set to an sfrtfi_inplace oneshot. At block 1250 the uRTFI config file is updated.

At block 1212 RTFI then kexecs to the init script at block 1214 in the new image. At block 1222 a setup is performed to identify devices 1224, modules 1226 and drives 1228. At block 1234 the old directories are prepared, and at block 1236 one or more overlays are configured and at block 1238 the uRTFI is unpacked. At block 1239 the mounts are fixed up. At block 1242 a switch_root is setup and at block 1244 the switch_root is executed. On failure, the processing indicated in FIG. 13 is activated.

Referring to FIG. 13, the process begins at block 1305 with a sfrfti_inplace in the destination image. At block 1310 a sfrtfi_rollback is in the uRFTI image. If, at block 1316, there is not an rtfi-classic in the config file (urtfi.cfg) then at block 1320 the process reverts to a traditional rollback. By contrast, if at block 1316, there is an rtfi-classic in the config file (urtfi.cfg) then at block 1330 an overlay directory is rebuilt, at block 1335 the bootloader is setup, at block 1340 a kexec operation is setup, and at block 1350 a config file is merged.

At block 1312 RTFI then kexecs to the init script at block 1314 in the new image. At block 1322 a setup is performed to identify devices 1324, modules 1326 and drives 1328. At block 1334 a runtime is prepared, and at block 1336 one or more overlays are configured and at block 1238 the filesystem is mounted in the overlay. At block 1342 a switch_root is setup and at block 1344 the switch_root is executed. On failure, the processing indicated in FIG. 13 is activated.

Figure 14:
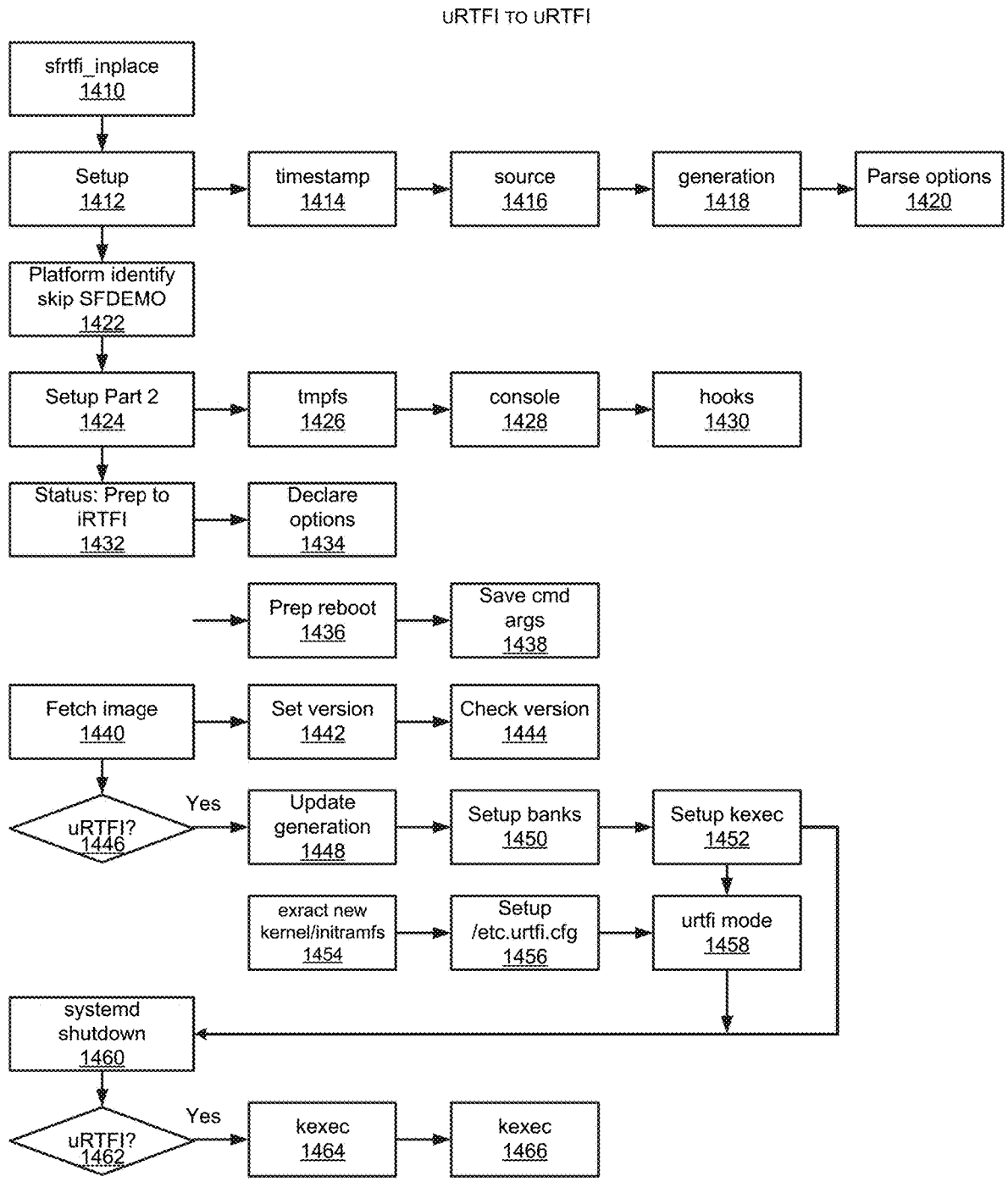
FIG. 14 is a flow diagram illustrating operations in a downgrade process from uRFTI to a pre-uRFTI, according to embodiments.

FIG. 14 is a flow diagram illustrating operations in a downgrade process from uRFTI to a pre-uRFTI, according to embodiments. Referring to FIG. 14, at block 1410 an irfti_inplace operation is started. At block 1412 a setup operation is started to generate a timestamp 1414, a source 1416, a generation 1418, and to identify one or more parse options 1420. At block 1422 a platform identify operation is implemented. At block 1424 a second setup operation is started to identify the temporary file storage paradigm (tmpfs) 1426, a console 1428, and one or more hooks 1430. At block 1432 a preparation operation is conducted and at block 1434 options are declared. At block 1436 a reboot is prepared and at operation 1438 command arguments are saved At block 1440 an image of the filesystem is fetched, at block 1442 the version is set, and at block 1444 the version is checked. If, at block 1446, the update is a uRFTI, then at block 1448 the generation of the filesystem is updated. At block 1450 the banks are setup and at block 1452 the kexec is setup. At operation 1454 new kernel and/or initramfs is extracted and at block 1456 a new config file for a uRFTI is setup. At block 1458 the mode is set to uRFTI. At operation 1460 a systemd shutdown is implemented. If, at block 1462 the update is a uRFTI then at operation 1464 a downgrade is setup and at operation 1466 a kexec is implemented Example Computer System Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 15:
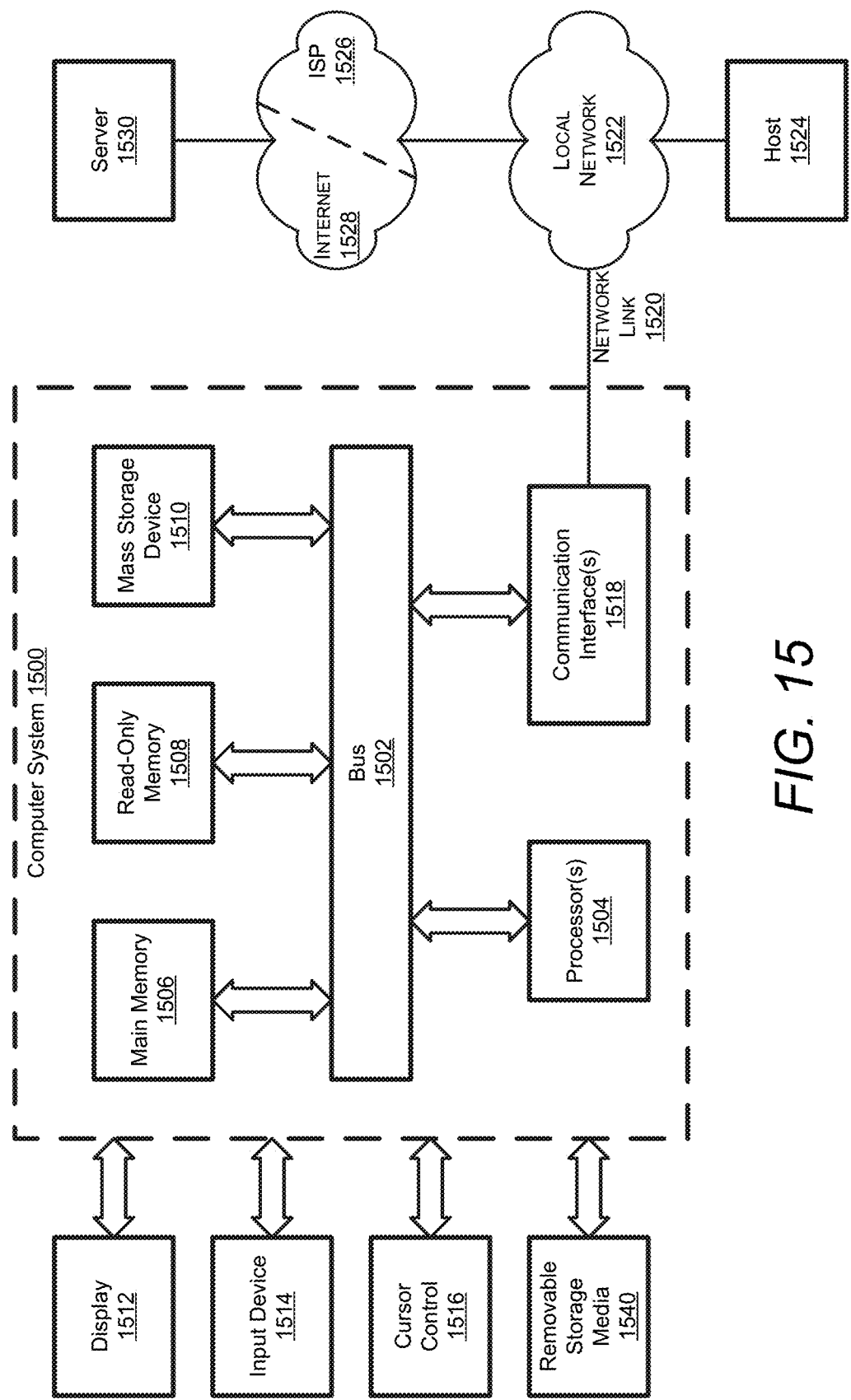
FIG. 15 illustrates an example computer system in which or with which embodiments of the present disclosure may be utilized.

FIG. 15 is a block diagram that illustrates a computer system 1500 in which or with which an embodiment of the present disclosure may be implemented. Computer system 1500 may be representative of all or a portion of the computing resources associated with a storage node (e.g., storage node 136), a performance manager (e.g., performance manager 138), a monitoring system (e.g., monitoring system 230) or an administrative work station (e.g., computer system 110). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., a hardware processor 1504) coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc—Re-Writable (CD-RW), Digital Video Disk-Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

What is claimed is:

1. A method performed by one or more processing resources of one or more computer systems, the method comprising:
   implementing a multi-tiered file system in a storage node, the multi-tiered filesystem having an on-disk layout that segregates a base configuration of an operating system of the storage node from runtime data associated with the operating system, containing modifications to the base configuration, the multi-tiered file system comprising (i) a read-only layer that contains the base configuration for the storage node including an image of a first version of the operating system and (ii) a read-write layer that contains the runtime data;
   upgrading the first version of the operating system to a second version of the operating system without requiring a root partition of a boot disk of the storage node to be recreated by:
      combining the read-only layer and the read-write layer into an overlay filesystem that is presented to the operating system as the root partition; and
      configuring the storage node to use a new image of the second version of the operating system in place of the image stored on the root partition; and
      performing a soft reboot to cause a return to factory image (RTFI) process to install the second version of the operating system via the overlay filesystem without modifying the read-write layer.

2. The method of claim 1, wherein the read-only layer is embodied on a read-only computer readable medium.

3. The method of claim 1, wherein the image comprises a squashfs image and wherein the method further comprises generating the squashfs image to be used as a source archive for an initial RTFI process performed prior to said upgrading.

4. The method of claim 3, wherein the squashfs image is used as the read-only layer of the multi-tiered file system.

5. The method of claim 4, further comprising:
   partitioning the boot disk with at least a boot partition, the root partition and a log partition; and
   installing, into the root partition, the squashfs image and one or more RTFI update packages during a startup process.

6. The method of claim 5, wherein the new image comprises a new squashfs image and wherein the method further comprises:
   receiving in the storage node, during an upgrade process, the new squashfs image; and
   installing, into the root partition, the new squashfs image during the upgrade process.

7. A system comprising:
   one or more processing resources; and
   a non-transitory computer-readable medium, coupled to the one or more processing resources, having stored therein instructions that when executed by the one or more processing resources cause the one or more processing resources to:
   implement a multi-tiered file system in a storage node, the multi-tiered filesystem having an on-disk layout that segregates a base configuration of an operating system of the storage node from runtime data associated with the operating system, containing modifications to the base configuration, the multi-tiered file system comprising (i) a read-only layer that contains the base configuration for the storage node including an image of a first version of the operating system and (ii) a read-write layer that contains the runtime data;

upgrade the first version of the operating system to a second version of the operating system without requiring a root partition of a boot disk of the storage node to be recreated by:

combining the read-only layer and the read-write layer into an overlay filesystem that is presented to the operating system as the root partition; and configuring the storage node to use a new image of the second version of the operating system in place of the image stored on the root partition; and performing a soft reboot to cause a return to factory image (RTFI) process to install the second version of the operating system via the overlay filesystem without modifying the read-write layer.

8. The system of claim 7, wherein the read-only layer is embodied on a read-only computer readable medium.

9. The system of claim 7, wherein the image comprises a squashfs image and wherein the instructions further cause the one or more processing resources to generate the squashfs image to be used as a source archive for an initial RTFI process performed prior to upgrading the first version of the operating system.

10. The system of claim 9, wherein the squashfs image is used as the read-only layer of the multi-tiered file system.

11. The system of claim 10, wherein the instructions further cause the one or more processing resources to:
partition the boot disk with at least a boot partition, the root partition and a log partition; and
install, into the root partition, the squashfs image and one or more RTFI update packages during a startup process.

12. The system of claim 11, wherein the new image comprises a new squashfs image and wherein the instructions further cause the one or more processing resources to:
receive in the storage node, during an upgrade process, the new squashfs image; and
install, into the root partition, the new squashfs image during the upgrade process.

13. A non-transitory computer-readable storage medium embodying a set of instructions, which when executed by one or more processing resources cause the one or more processing resources to:
implement a multi-tiered file system in a storage node, the multi-tiered filesystem having an on-disk layout that segregates a base configuration of an operating system of the storage node from runtime data associated with the operating system, containing modifications to the base configuration, the multi-tiered file system comprising (i) a read-only layer that contains the base configuration for the storage node including an image of a first version of the operating system and (ii) a read-write layer that contains the runtime data;

upgrade the first version of the operating system to a second version of the operating system without requiring a root partition of a boot disk of the storage node to be recreated by:

combining the read-only layer and the read-write layer into an overlay filesystem that is presented to the operating system as the root partition; and configuring the storage node to use a new image of the second version of the operating system in place of the image stored on the root partition; and performing a soft reboot to cause a return to factory image (RTFI) process to install the second version of the operating system via the overlay filesystem without modifying the read-write layer.

14. The non-transitory computer-readable storage medium of claim 13, wherein the read-only layer is embodied on a read-only computer readable medium.

15. The non-transitory computer-readable storage medium of claim 13, wherein the image comprises a squashfs image and wherein the instructions further cause the one or more processing resources to generate the squashfs image to be used as a source archive for an initial RTFI process performed prior to upgrading the first version of the operating system.

16. The non-transitory computer-readable storage medium of claim 15, wherein the squashfs image is used as the read-only layer of the multi-tiered file system.

17. The non-transitory computer-readable storage medium of claim 16, wherein the instructions further cause the one or more processing resources to:
partition the boot disk with at least a boot partition, the root partition and a log partition; and
install, into the root partition, the squashfs image and one or more RTFI update packages during a startup process.

18. The non-transitory computer-readable storage medium of claim 17, wherein the new image comprises a new squashfs image and wherein the instructions further cause the one or more processing resources to:
receive in the storage node, during an upgrade process, the new squashfs image; and
install, into the root partition, the new squashfs image during the upgrade process.

* * * * *